United States Patent
Makino

(10) Patent No.: US 7,587,226 B2
(45) Date of Patent: Sep. 8, 2009

(54) FOLDING CELLULAR PHONE

(75) Inventor: Minoru Makino, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 11/304,729

(22) Filed: Dec. 16, 2005

(65) Prior Publication Data

US 2006/0199606 A1    Sep. 7, 2006

(30) Foreign Application Priority Data

Mar. 2, 2005    (JP) .............................. 2005-057065

(51) Int. Cl.
*H04M 1/00* (2006.01)

(52) U.S. Cl. ................................. 455/575.3; 455/550.1

(58) Field of Classification Search .............. 455/550.1, 455/575.3
See application file for complete search history.

(56) References Cited

U.S. PATENT DOCUMENTS

| | | | |
|---|---|---|---|
| 5,629,833 A | 5/1997 | Ido et al. | |
| 7,096,540 B2 | 8/2006 | Watanabe et al. | |
| 7,194,290 B2 | 3/2007 | Matsunami et al. | |
| 7,320,153 B2 | 1/2008 | Watanabe et al. | |
| 2002/0155740 A1 | 10/2002 | Sawada et al. | |
| 2003/0203747 A1 | 10/2003 | Nagamine | |
| 2003/0223576 A1 | 12/2003 | Totani | |
| 2005/0091431 A1* | 4/2005 | Olodort et al. ................ | 710/72 |

FOREIGN PATENT DOCUMENTS

| | | | |
|---|---|---|---|
| EP | 0 416 922 A2 | 9/1990 | |
| EP | 0 703 401 A1 | 3/1996 | |
| EP | 1 298 890 A2 | 4/2003 | |
| EP | 1427172 A2 | 6/2004 | |
| EP | 1 486 688 A1 | 12/2004 | |
| EP | 1 885 102 A1 | 2/2008 | |
| JP | 8-63259 A | 3/1996 | |
| JP | 2000-020166 A | 1/2000 | |
| JP | 2001-142408 A | 5/2001 | |
| JP | 2001-156893 A | 6/2001 | |
| JP | 2003-319043 A | 11/2003 | |
| JP | 2004-78073 A | 3/2004 | |
| JP | 2004-088316 A | 3/2004 | |
| JP | 2004-187186 A | 7/2004 | |
| JP | 2004-215180 A | 7/2004 | |
| JP | 2004-302491 A | 10/2004 | |
| JP | 2006-332795 A | 12/2006 | |
| KR | 10-2005-0014095 A | 2/2005 | |
| WO | WO-2004/019308 A1 | 3/2004 | |

* cited by examiner

*Primary Examiner*—Nick Corsaro
*Assistant Examiner*—Joel Ajay
(74) *Attorney, Agent, or Firm*—Birch, Stewart, Kolasch & Birch, LLP

(57) ABSTRACT

A folding cellular phone includes a hinge for connecting a first housing and a second housing having an operation part in a pivotable manner to open/close the folding cellular phone. A liquid crystal display part is supported on the first housing by a support mechanism such that the orientation of the liquid crystal display part is changeable between portrait and landscape. The folding cellular phone further includes a rod-shaped restriction member (an open/close restriction means) which is operated together with the support mechanism and the hinge such that the movement of the first and second housings is restricted so as not to reduce the angle formed between the first and second housings less than the predetermined angle (e.g., 120°).

9 Claims, 11 Drawing Sheets

FOLDING CELLULAR PHONE

CROSS-REFERENCE TO RELATED APPLICATION

This non-provisional application claims priority under 35 U.S.C. §119(a) of Japanese Patent Application No. 2005-57065 filed in Japan on Mar. 2, 2005, the entire contents of which are hereby incorporated by reference.

BACKGROUND OF THE INVENTION

1. Field of the Invention

The present invention relates to a folding cellular phone, particularly to a folding cellular phone in which a liquid crystal display part is supported to be changeable between landscape and portrait orientation.

2. Description of Related Art

In recent years, cellular phones are provided with various capabilities in addition to the communication function, such as e-mail transmission/reception, digital camera shooting, recording/reproducing, television reception, scheduling and so on.

However, the chief function of the cellular phone is making and receiving calls. For greater portability and salability of the cellular phone, importance has been placed on downsizing and weight reduction. In view of operability, the cellular phone is vertically oriented and reduced in width.

When a liquid crystal display part of the cellular phone is fixed in the portrait orientation, a landscape image needs to be scaled down so that the image fits in the portrait screen or a viewer has to scroll the image horizontally to see the whole image.

If rotated 90 degrees, the landscape image is displayed full on the portrait display without scaling down. The liquid crystal display part and an operation part of the folding cellular phone come into sight when the cellular phone is opened. When the user rotates the cellular phone 90 degrees to see the landscape image, the operation part is also rotated 90 degrees. It is troublesome and difficult for the user to do input with the operation keys in such an unusual orientation.

To solve the problem, for example, Japanese Unexamined Patent Publication No. 2001-156893 discloses a folding cellular phone including a liquid crystal display part which is supported on a first housing such that the orientation thereof is changeable from portrait to landscape while the cellular phone itself is held in the portrait orientation. The liquid crystal display part of the folding cellular phone is supported by a rotation axis arranged at a center portion thereof to extend vertical to the liquid crystal display part such that the liquid crystal display part is rotated 90 degrees about the rotation axis.

In order to rotate the liquid crystal display part without contacting a second housing so as not to cause damage to the liquid crystal display part and the second housing while preventing an increase in size and thickness of the cellular phone, the bottom side of the liquid crystal display part needs to be rounded to form an arc corresponding to the circumference of a circle having the rotation axis as the center, or alternatively, the rotation axis is positioned away from the second housing. In such a case, the liquid crystal display part cannot be enlarged or the size of the cellular phone itself increases.

For example, Japanese Unexamined Patent Publication No. 2003-319043 discloses a folding cellular phone including a support mechanism for supporting the liquid crystal display part on a first housing in a slidable and rotatable manner. The liquid crystal display part of the folding cellular phone first slides in the vertical direction and then rotates about a rotation axis arranged at a center portion of the liquid crystal display part. Therefore, the liquid crystal display part does not contact the second housing and the liquid crystal display part and the second housing are not damaged. Thus, the liquid crystal display part is enlarged.

Further, Japanese Unexamined Patent Publication No. 2004-78073 discloses a support mechanism for a liquid crystal display device which makes it possible to change the orientation of the liquid crystal display part between portrait and landscape.

In the near future, digital terrestrial television broadcasting will begin in earnest. Unlike the conventional analog television broadcasting, the digital terrestrial television broadcasting provides so-called interactive services. For example, people can take part in a quiz show, do shopping or complete payment to a bank account through a television set.

If the cellular phone is configured to receive the digital terrestrial television broadcasting, the user needs to operate the keys looking at an image on the display screen. In general, television images are landscape-oriented. Therefore, in order to see the landscape television image as large as possible on the small liquid crystal display of the cellular phone, the liquid crystal display needs to be landscape-oriented.

The cellular phone according to Japanese Unexamined Patent Publication No. 2003-319043, however, requires two kinds of movements, i.e., slide and rotation, to change the orientation. These movements cannot be achieved by a single hand, thereby complicating the operation.

Further, the liquid crystal display device according to Japanese Unexamined Patent Publication No. 2004-78073 is not required to reduce the size and weight as strictly as the cellular phone is. In addition, the liquid crystal display part thereof does not require frequent changes between portrait and landscape orientation. Therefore, the switching mechanism is complicated and the operation thereof is also complicated.

SUMMARY OF THE INVENTION

The present invention has been achieved in view of the above-described problems. An object of the present invention is to restrict the open/close movement of the first housing and the second housing under a certain condition so as to prevent damage to the liquid crystal display part and the second housing caused upon changing the orientation of the liquid crystal display part without shifting the rotation axis of the liquid crystal display part away from the second housing, reducing the size of the liquid crystal display part and increasing the size of the cellular phone.

To achieve the object, according to the present invention, the first and second housings are not allowed to be closed to form an angle less than the predetermined angle when the liquid crystal display part is not in the portrait orientation.

Specifically, the folding cellular phone according to the present invention includes: a first housing provided with a liquid crystal display part on the surface thereof; a second housing including an operation part formed on the surface thereof; and a hinge for connecting the first housing and the second housing in a pivotable manner to open/close the folding cellular phone.

The liquid crystal display part is supported on the first housing such that the orientation of the liquid crystal display part is changeable between portrait and landscape and when the liquid crystal display part is not in the portrait orientation, the movement of the first and second housings is restricted by an open/close restriction means such that an angle formed between the first and second housings is not reduced less than the predetermined angle.

According to the above-described features, the liquid crystal display part is used in the portrait orientation when the main functions of the cellular phone such as making/receiving calls or sending/receiving e-mails are used. When the digital terrestrial television broadcasting is received or an e-mail is prepared or read in English, the liquid crystal display part is changed to the landscape orientation so that a landscape image is displayed full on the screen and the user does input with the operation keys of the operation part kept in the usual portrait orientation. In this manner, the orientation of the liquid crystal display part is changed between portrait and landscape. At this time, if the rotation axis of the liquid crystal display part is not shifted away from the second housing, the bottom side of the liquid crystal display part is positioned below the hinge when the liquid crystal display part is not in the portrait orientation. Therefore, when the first and second housings are closed when the liquid crystal display part is not in the portrait orientation, the liquid crystal display part may be damaged by contacting the second housing.

According to the present invention, however, when the liquid crystal display part is not in the portrait orientation, i.e., in the landscape orientation or on the way to changing the orientation between portrait and landscape, the first and second housings are restricted by the open/close restriction means so as not to form an angle less than the predetermined angle. Therefore, even if the rotation axis of the liquid crystal display part is not shifted away from the second housing, the liquid crystal display part is not damaged by contacting the second housing. Further, when the liquid crystal display part is in the portrait orientation, the open/close restriction means does not restrict the open/close movement of the first and second housings. Therefore, the first and second housings are freely moved to open/close the cellular phone. In this case, as the bottom side of the liquid crystal display part is not positioned below the hinge, the liquid crystal display part will not contact the second housing.

It is preferred that the orientation of the liquid crystal display part is changeable between portrait and landscape only when the angle formed between the first and second housings is greater than the predetermined angle.

According to the above-described feature, the orientation of the liquid crystal display part is changeable only when the first and second housings are opened to form an angle greater than the predetermined angle. Therefore, even if the liquid crystal display part is not reduced in size and the rotation axis of the liquid crystal display part is not shifted away from the second housing for preventing the liquid crystal display part from contacting the second housing upon changing the orientation, and even if the liquid crystal display part contacts the second housing when the first and second housings are closed to form an angle less than the predetermined angle, the liquid crystal display part is prevented from contacting the second housing.

It is preferred that the liquid crystal display part is supported on the first housing by a support mechanism such that the orientation of the liquid crystal display part is changeable between portrait and landscape and the open/close restriction means is operated together with the support mechanism and the hinge such that the movement of the first and second housings is restricted so as not to form an angle less than the predetermined angle therebetween when the liquid crystal display part is not in the portrait orientation.

According to the above-described features, the open/close restriction means is operated together with the support mechanism for supporting the liquid crystal display part on the first housing and the hinge for connecting the first and second housing in a pivotable manner to open/close the cellular phone such that the movement of the first and second housings is restricted so as not to form an angle less than the predetermined angle therebetween when the liquid crystal display part is not in the portrait orientation. However, when the liquid crystal display part is in the portrait orientation, the open/close restriction means does not restrict the open/close movement of the first and second housings. Therefore, the first and second housings are closed to form an angle less than the predetermined angle.

It is preferred that the first housing is provided with a recess which is formed at a portion shifted to the right or left from the horizontal center of the first housing for installing therein the support mechanism and has an opening in part of the sidewall thereof close to the hinge, the support mechanism is attached to the rear surface of the liquid crystal display part and includes a mounting bracket to be installed in the recess of the first housing and a rotation axis provided in the recess to support the liquid crystal display part on the first housing via the mounting bracket such that the orientation of the liquid crystal display part is changeable between portrait and landscape, the mounting bracket having a cam surface which is a side surface of a convex portion thereof bulging toward the hinge, the hinge includes an open/close shaft for connecting the first and second housings in a pivotable manner to open/close the folding cellular phone and a restriction hole formed in a predetermined position of the circumference surface of the open/close shaft and the open/close restriction means is a rod-shaped restriction member which is inserted in the opening in the recess and abuts on the cam surface of the mounting bracket at one end such that when the orientation of the liquid crystal display part is changed from portrait to landscape, the open/close restriction means is pushed by the cam surface toward the hinge and an insertion part formed at the other end is inserted in the restriction hole of the hinge, thereby restricting the open/close movement of the first and second housings.

According to the above-described features, when the orientation of the liquid crystal display part is changed from portrait to landscape, the rod-shaped restriction member arranged to pass through the opening formed in the recess of the first housing is pushed by the cam surface of the mounting bracket at one end toward the hinge and the insertion part formed at the other end is inserted in the restriction hole of the hinge. Therefore, even though the open/close shaft of the hinge starts to rotate when the first and second housings are closed, the rotation of the open/close shaft is hindered because the insertion part contacts the wall defining the restriction hole. As the open/close movement of the first and second housings is restricted in this manner, the liquid crystal display part is prevented from contacting the second housing even if the rotation axis of the liquid crystal display part is not shifted away from the second housing.

It is preferred that part of the outer circumference surface of the hinge which is positioned laterally outside the restriction hole serves as a cam surface, the mounting bracket attached to the liquid crystal display part includes a protrusion which is formed slightly laterally inside the cam surface of the hinge and protrudes toward the hinge for restricting the rotation of the liquid crystal display part and a rod-shaped rotation stopping member for restricting the rotation of the liquid crystal display part is provided laterally outside the rod-shaped restriction member and inserted in the opening in the recess such that, when the angle formed between the first and second housings is less than the predetermined angle, one end of the rod-shaped restriction member abutting on the cam surface of the hinge is pushed by the cam surface of the hinge toward the mounting bracket and the other end positioned laterally outside the protrusion of the mounting bracket abuts on the protrusion of the mounting bracket to restrict the rotation of the liquid crystal display part.

According to the above-described features, when the first and second housings are closed to form an angle less than the predetermined angle, one end of the rod-shaped rotation stopping member is pushed toward the mounting bracket, while the other end is positioned laterally outside the projection of the mounting bracket. By so doing, even if the user tries to rotate the liquid crystal display part, the other end of the rotation stopping member abuts on the projection to restrict the rotation. Therefore, the liquid crystal display part is prevented from contacting the second housing even if the rotation axis of the liquid crystal display part is not shifted away from the second housing.

It is preferred that an elastic member for biasing the liquid crystal display part to be in the portrait or landscape orientation is provided.

According to the above-described feature, by adjusting the biasing force of the elastic member to the liquid crystal display part, the orientation change of the liquid crystal display part from portrait to landscape is assisted by the elastic member.

It is preferred that the elastic member is a compression coil spring which abuts on a first abutting plate attached to the rod-shaped restriction member at one end and on a second abutting plate attached to the rotation stopping member at the other end.

According to the above-described feature, the elastic member is achieved by a simple and hard-to-break structure. Since the compression coil spring is sandwiched between the first and second abutting plates, when the rod-shaped restriction member is pushed by the cam surface of the mounting bracket toward the hinge upon changing the orientation from portrait to landscape, the compression coil spring is pressed by the first abutting plate of the rod-shaped restriction member. Then, when the liquid crystal display part is further rotated against the elastic force of the compression coil spring, the rod-shaped restriction member passes the convex part of the cam surface of the mounting bracket and then slides toward the mounting bracket. At this time, the elastic force of the compression coil spring is exerted on the first abutting plate and the rod-shaped restriction member pushes up the cam surface of the mounting bracket. Thus, the liquid crystal display part is assisted to change the orientation from portrait to landscape. Likewise, the orientation change to landscape to portrait is also assisted by the elastic force of the compression coil spring.

When the cellular phone is changed from the closed state to the opened state, the rotation stopping member is pushed by the cam surface of the hinge toward the mounting bracket. As a result, the second abutting plate of the rotation stopping member pushes up the compression coil spring, thereby pushing the first abutting plate up by the elastic force of the compression coil spring. At this time, the rod-shaped restriction member attached with the first abutting plate pushes the cam surface of the mounting bracket, thereby pushing the first housing in the direction away from the second housing. Thus, the opening movement is assisted.

It is preferred that the horizontal center of the portrait- or landscape-oriented liquid crystal display part is positioned substantially at the horizontal center of the first housing.

Specifically, when a conventional rotation axis for supporting the liquid crystal display part on the first housing is provided at a center portion of the liquid crystal display part and the horizontal center of the landscape-oriented liquid crystal display part is required to be positioned substantially at the horizontal center of the first housing, the liquid crystal display part must be reduced in length from the top end in accordance with the bottom end unless the rotation axis is shifted away from the second housing. As a result, the liquid crystal display part is reduced in size.

According to the present invention, however, the open/close restriction means restricts the movement of the first and second housings so as not to form an angle less than the predetermined angle when the liquid crystal display part is not in the portrait orientation. Therefore, even if the rotation axis is not shifted away from the second housing, the liquid crystal display part is not damaged by contacting the second housing. Whether the orientation is portrait or landscape, the liquid crystal display part is positioned substantially at the horizontal center of the first housing even if the length of the liquid crystal display part is not reduced from the top end. As a result, the liquid crystal display part is positioned at the horizontal center of the operation part.

It is preferred that the liquid crystal display part has a linear side which comes to the bottom when the liquid crystal display part is in the portrait orientation.

According to the above-described feature, the open/close restriction means restricts the movement of the first and second housings so as not to form an angle less than the predetermined angle when the orientation of the liquid crystal display part is other than the portrait orientation, which involves with a problem of contact with the second housing. Therefore, even if the liquid crystal display part has a linear bottom side and the rotation axis of the liquid crystal display part is not shifted away from the second housing, the liquid crystal display part is prevented from damage caused by contacting the second housing.

DETAILED DESCRIPTION OF THE INVENTION

Hereinafter, preferred embodiments of the present invention will be explained with reference to the drawings.

Figure 1:
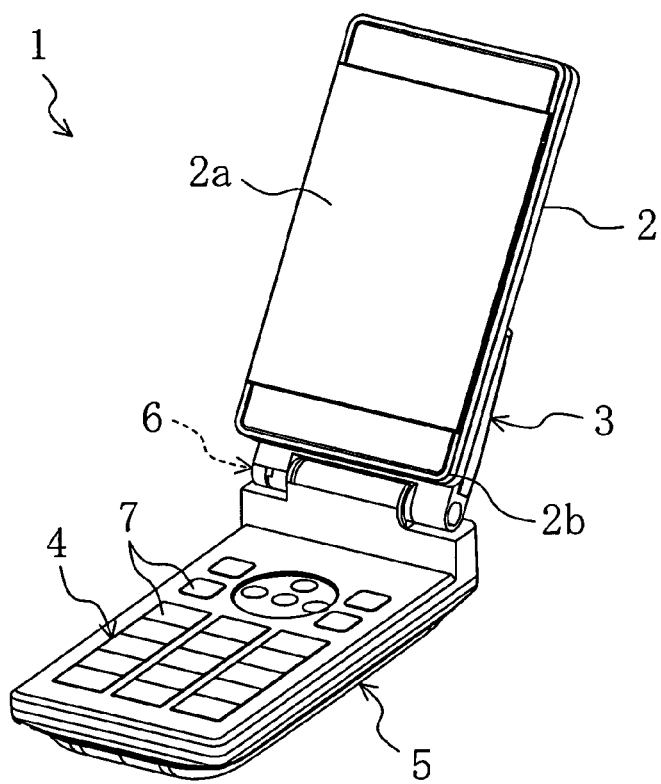
FIG. 1 is an oblique view illustrating a folding cellular phone according to an embodiment of the present invention in an opened state with a liquid crystal display part in the portrait orientation.
Figure 2:
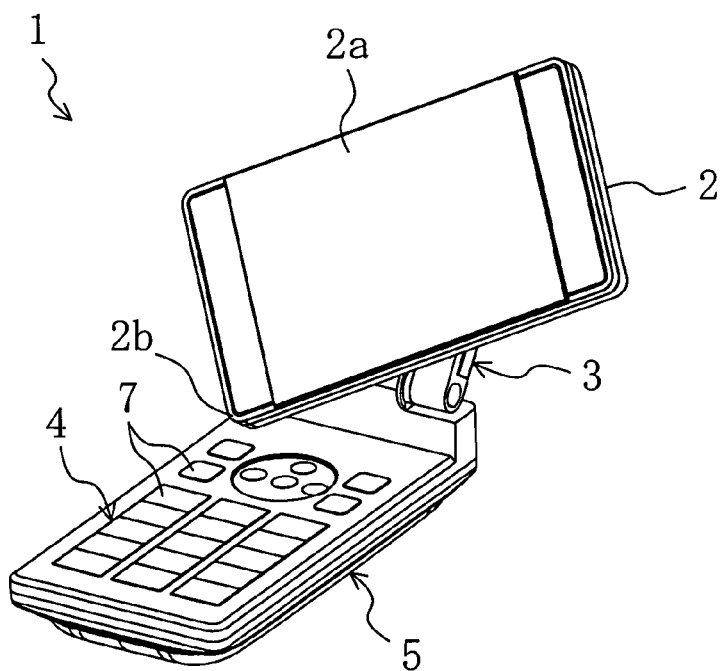
FIG. 2 is an oblique view illustrating the folding cellular phone in the opened state with the liquid crystal display part changing to the portrait or landscape orientation.
Figure 3:
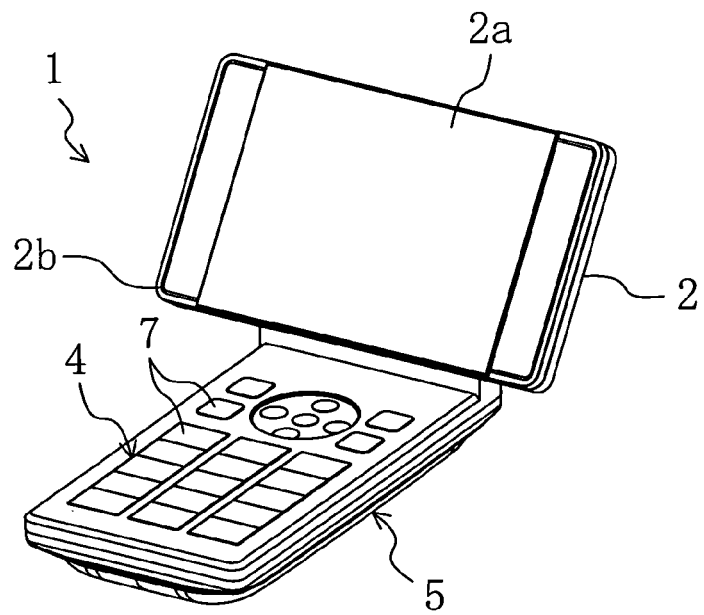
FIG. 3 is an oblique view illustrating the folding cellular phone in the opened state with the liquid crystal display part in the landscape orientation.
Figure 4:
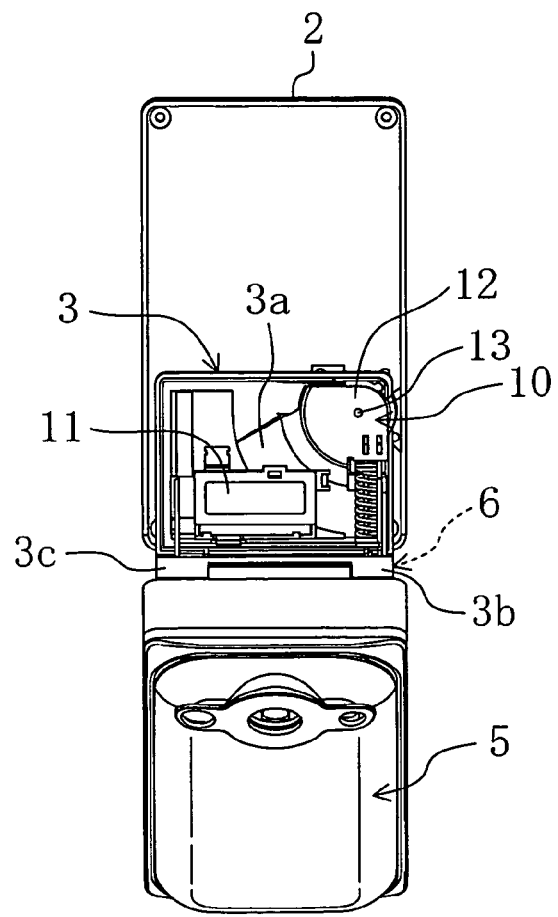
FIG. 4 is a back view of the folding cellular phone when the liquid crystal display part is portrait-oriented.

FIG. 1 is an oblique view illustrating a folding cellular phone in an opened state with a liquid crystal display part in the portrait orientation. FIG. 2 is an oblique view illustrating the folding cellular phone with the liquid crystal display part changing to the portrait or landscape orientation. FIG. 3 is an oblique view illustrating the folding cellular phone with the liquid crystal display part in the landscape orientation.

The folding cellular phone 1 of the present embodiment includes a first housing 3 provided with a liquid crystal display part 2 on the surface thereof, a second housing 5 including an operation part 4 formed on the surface thereof and a hinge 6 for connecting the first and second housings 3 and 5 in a pivotable manner to open/close the folding cellular phone 1. The first and second housings 3 and 5 are electrically connected by signal lines (not shown) passing through the hinge 6. Thus, the folding cellular phone 1 is changeable between the closed state (not shown) and the opened state shown in FIGS. 1 to 3. Hereinafter, the first and second housings 3 and 5 are regarded as top and bottom housings, respectively.

The operation part 4 of the second housing 5 includes a plurality of operation keys 7. The operation keys 7 are arranged such that the user can do input smoothly when he/she holds the folding cellular phone 1 in the portrait orientation and provided with markings on their surfaces. Various functions of the folding cellular phone 1 are available through the operation with the operation keys 7. The second housing 5 is also provided with a microphone for communication (not shown).

As shown in FIGS. 4 to 11, the first housing 3 is provided with a support mechanism 10 for supporting the liquid crystal display part 2 in the form of an almost rectangular plate such that the orientation of the liquid crystal display part 2 is changeable between portrait and landscape. The first housing 3 includes a first housing body 3b facing the liquid crystal display part 2, open/close shaft supports 3b and 3c for receiving left and right open/close shafts of the hinge 6 described later and a rear cover (not shown) in the form of a rectangular dish for covering the first housing body 3a.

The liquid crystal display part 2 has a linear side which comes to the bottom when the liquid crystal display part 2 is portrait-oriented. A rectangular liquid crystal display 2a is provided on the almost entire surface of the liquid crystal display part 2. A speaker for communication (not shown) is provided at an end portion of the liquid crystal display part 2 which comes to the top when the liquid crystal display part 2 is portrait-oriented. The corners of the liquid crystal display part 2, including a bottom right corner 2b, are chamfered for design or safety purposes. The bottom side of the liquid crystal display part 2 in the portrait orientation is linear except the corners. Below the support mechanism 10, a rear liquid crystal display 11 (shown in FIG. 4 only) is provided on the rear surface of the first housing 3 for indicating time or other information when the cellular phone is closed.

The liquid crystal display part 2 and the operation part 4 come into sight when the cellular phone 1 is opened. Whether the liquid crystal display part 2 is portrait- or landscape-oriented, the user handles the operation keys 7 of the operation part 4 in the portrait orientation looking at the liquid crystal display 2a of the liquid crystal display part 2. Whether the liquid crystal display part 2 is portrait- or landscape-oriented, the horizontal center of the liquid crystal display part 2 is positioned substantially at the horizontal center of the first housing 3.

The support mechanism 10 includes a mounting bracket 12 attached to the rear surface of the liquid crystal display part 2 and a rotation axis 13 for supporting the liquid crystal display part 2 on the first housings 3 via the mounting bracket 12 such that the orientation thereof is changeable. Specifically, as viewed from the front, a recess 14 for installing the support mechanism 10 is formed at a top left portion of the first housing body 3a. The recess 14 includes a bottom wall 14a in the form of a fan and a sidewall 14b formed to flare toward the front in the form of an arc when viewed in section cut along the direction parallel to the bottom wall 14a. A bottom end portion of the recess 14 close to the hinge 6 is cut away to provide an opening 14c. In the recess 14, the mounting bracket 12 is installed to be rotatable about the rotation axis 13. Though not shown, the signal lines extending from the second housing 5 passes through the recess 14 and connected to the liquid crystal display part 2.

The mounting bracket 12 includes a plate-shaped bracket body 12b sliding on the bottom wall 14a of the recess 14 and two mounting parts 12d extending perpendicular to the bracket body 12b and having through holes 12 for receiving screws at their end portions for fastening the mounting bracket 12 to the rear surface of the liquid crystal display part 2. The bracket body 12b has a convex part bulging toward the hinge 6 and the side surface thereof serves as a cam surface 12a.

Figure 17:
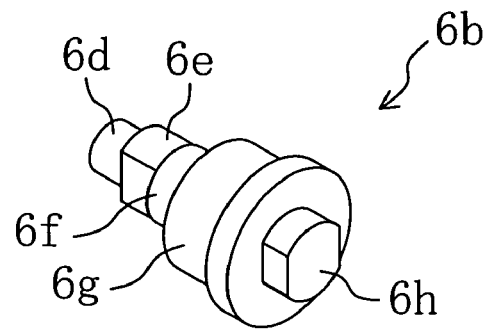
FIG. 17 is an enlarged oblique view illustrating a left open/close shaft.

The hinge 6 includes a hinge body 6a to be installed in the second housing 5 and left and right open/close shafts 6b and 6c arranged at the left and right sides of part of the hinge body 6a closer to the first housing 3 for connecting the first housing 3 to the second housing 5 in a pivotable manner to achieve opening/closing of the cellular phone 1. As seen in the front view of FIG. 17, the left open/close shaft 6b to be arranged at the left has, in the order from left to right, a pin-shaped tip 6d which faces outward when installed in the cellular phone, an engagement part 6e in the form of an oval when viewed from the side, a small diameter part 6f, a large diameter part 6g and an insertion part 6h having the same shape as the engagement part 6e. The insertion part 6h is inserted in an engagement hole of the hinge body 6a to connect the left open/close shaft 6b and the hinge body 6a.

The tip 6d of the left open/close shaft 6b is supported in a center hole formed in the left open/close shaft support 3b in the form of a disc. The right open/close shaft 6c is supported by the right open/close shaft support 3c in the form of a boss.

Figure 12:
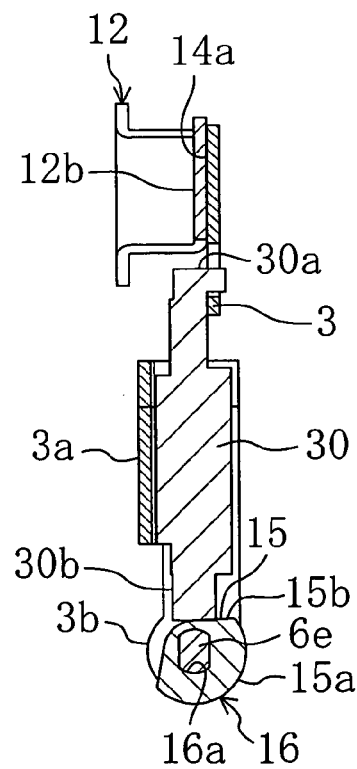
FIG. 12 is a sectional view taken along the line XII-XII shown in FIG. 11.
Figure 18A:
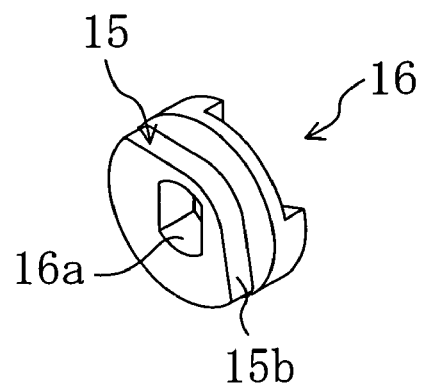
FIG. 18A is an enlarged oblique view of a cam as seen from the left and FIG. 18B is an enlarged oblique view of the cam as seen from the right.

As shown in FIGS. 12 and 18A, the engagement part 6e of the left open/close shaft 6b is engaged with a disc-shaped cam member 16. Part of the circumference surface of the cam member 16 serves as a cam surface 15. Specifically, the engagement part 6e is fitted in a substantially oval center hole 16a formed in the cam member 16 so that the cam member 16 rotates together with the left open/close shaft 6b. When viewed in the axis direction of the open/close shaft 6b, an arced part of the cam surface 15 serves as a rotation stopping part 15a and a substantially L-shaped part continuous from the rotation stopping part 15a serves as a rotation permitting part 15b. Specifically, part of the surface of the cam member 16 is cut away and a section obtained by cutting away the part is the rotation permitting part 15b and the rotation stopping part 15a is the circumference surface corresponding to the section. As the cam member 16 is a separate component, the cellular phone is easily assembled.

Figure 13:
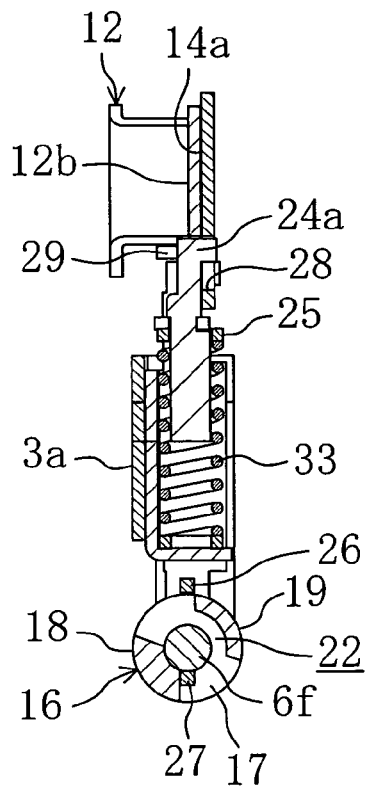
FIG. 13 is a sectional view taken along the line XIII-XIII shown in FIG. 11.
Figure 18B:
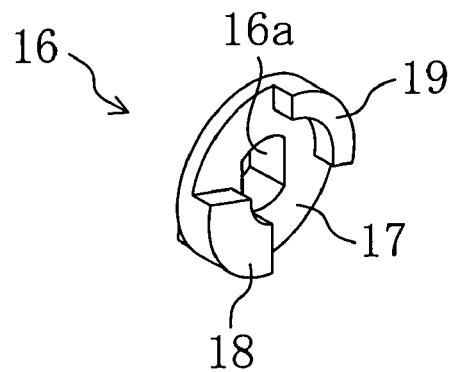

As shown in FIGS. 13 and 18B, on the side of the cam member 16 opposite to the side provided with the cam surface 15, i.e., the right side, a restriction hole 17 is formed. The restriction hole 17 is shaped such that, when the open/close shaft 6b is inserted in the cam member 16, openings are provided at the top and bottom to oppose each other along the radius direction. Specifically, the restriction hole 17 is formed by cutting part of the right side surface of the cam member 16 away such that two fan-shaped walls (a first fan-shaped wall 18 and a second fan-shaped wall 19) are left thereon. The inner diameter of the first fan-shaped wall 18 is equal to the outer diameter of the small diameter part 6f and the inner diameter of the second fan-shaped wall 19 is larger than the outer diameter of the small diameter part 6f. Thus, the second fan-shaped wall 19 and the left open/close shaft 6b form an arc-shaped open/close permitting gap 22 therebetween.

Figure 14:
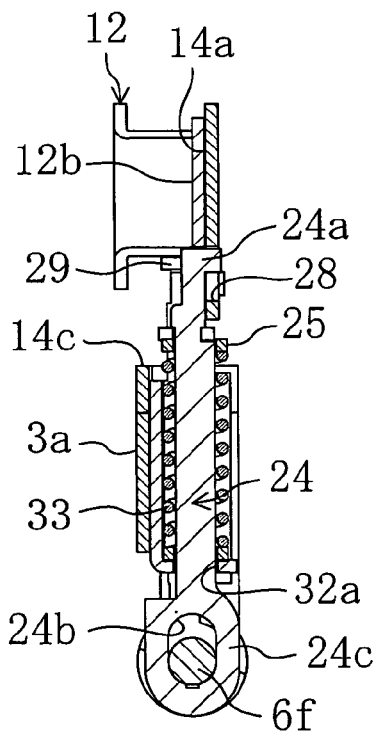
FIG. 14 is a sectional view taken along the line XIV-XIV shown in FIG. 11.

As shown in FIG. 14, the small diameter part 6f supports a rod-shaped restriction member 24 in a rotatable and horizontally slidable manner. The rod-shaped restriction member 24 serves as an open/close restriction means for restricting the open/close movement of the first and second housings 3 and 5.

Specifically, the rod-shaped restriction member 24 is in the form of a narrow plate and arranged in the first housing 3 to pass through the opening 14c of the recess 14 in the vertical direction. The rod-shaped restriction member 24 has an abutting part 24a for abutting the cam surface 12a at the top and a ring-shaped part 24c having an elongate hole 24b for receiving the small diameter part 6f at the bottom. A first abutting plate 25 in the rectangular form is fixed to part of the rod-shaped restriction member 24 close to the abutting part 24a so that the top end of a compression coil spring to be described later abuts thereon. Further, upper and lower insertion parts 26 and 27 protruding to the left are provided above and below the elongate hole 24b (shown in FIG. 13). When the orientation of the liquid crystal display part 2 is changed from portrait to landscape or in the opposite way, the abutting part 24a of the rod-shaped restriction member 24 is pushed by the cam surface 12a and the insertion parts 26 and 27 are inserted into the restriction hole 17. The abutting part 24a protrudes rearward from the rod-shaped restriction member 24 to be inserted in a vertically oriented first guide hole 28 formed in the bottom wall 14a of the recess 14. With the help of the first guide hole 28, the rod-shaped restriction member 24 slides smoothly in the vertical direction.

Figure 5:
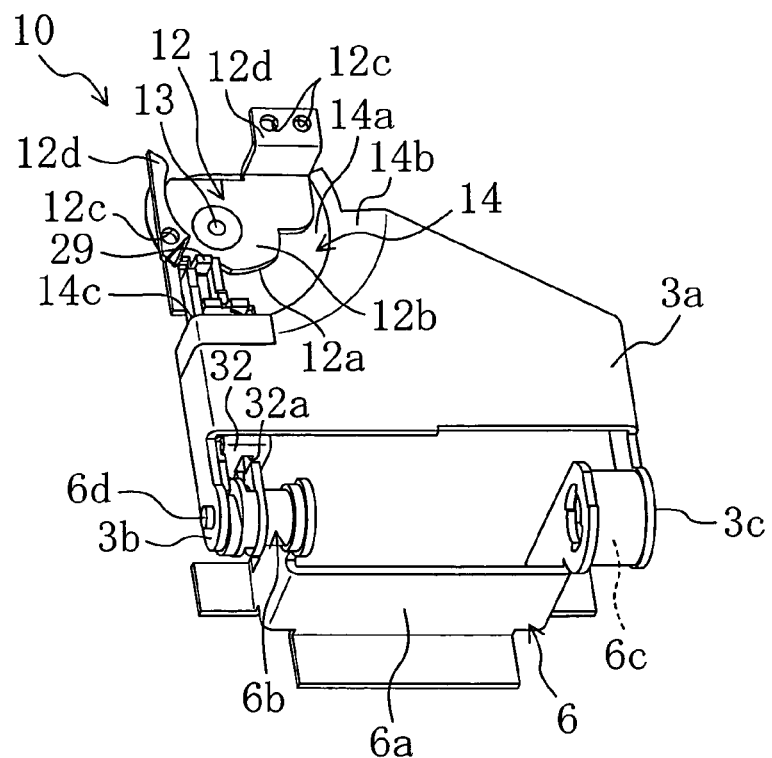
FIG. 5 is an oblique view illustrating a support mechanism, a hinge and the vicinity as viewed from the front when the folding cellular phone is opened and the liquid crystal display part is portrait-oriented.
Figure 6:
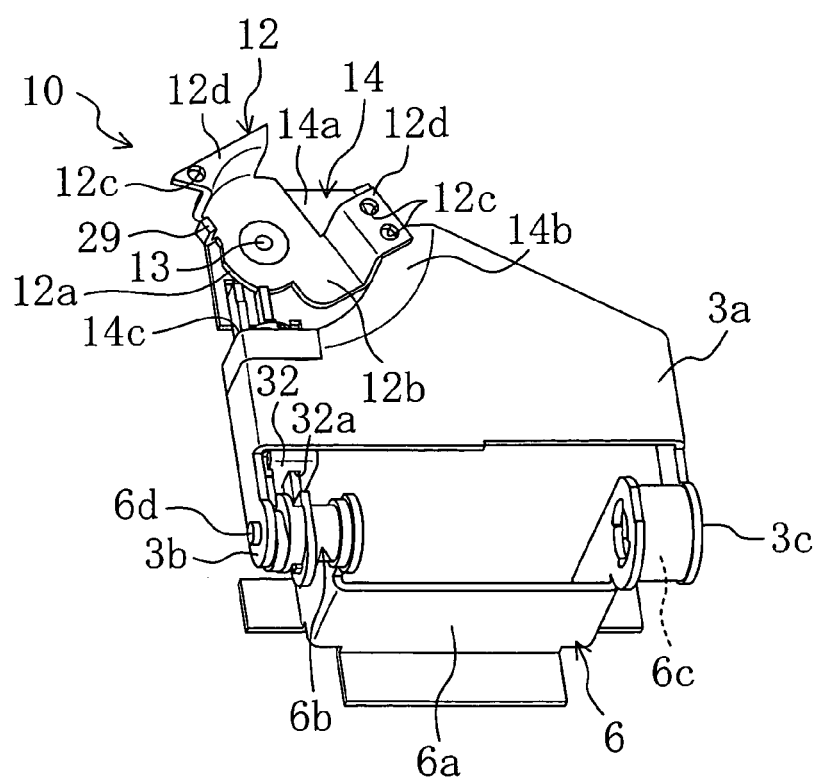
FIG. 6 is a view corresponding to FIG. 5 when the orientation of the liquid crystal display part is changing.
Figure 7:
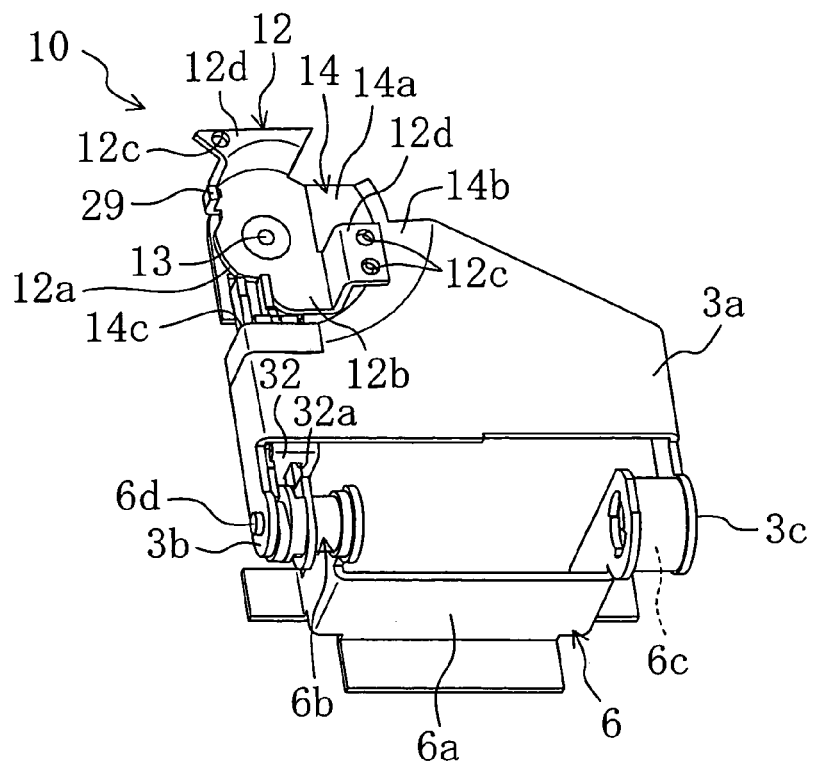
FIG. 7 is a view corresponding to FIG. 5 when the liquid crystal display part is landscape-oriented.

As shown in FIGS. 5 and 6, the mounting bracket 12 of the liquid crystal display part 2 is provided with a protrusion 29 for restricting the rotation. The protrusion 29 is positioned not just above the cam surface 15 but slightly shifted to the right and protrudes toward the hinge 6. When the liquid crystal display part 2 is portrait-oriented, the abutting part 24a of the rod-shaped restriction member 24 comes to the left end of the cam surface 12a, i.e., at the right of the protrusion 29, to prevent the liquid crystal display part 2 from rotating counterclockwise.

As shown in FIG. 12, a rod-shaped rotation stopping member 30 for restricting the rotation of the liquid crystal display part 2 is provided at the left of the rod-shaped restriction member 24. The top end 30a of the rotation stopping member 30 protrudes rearward in the same manner as the top end of the rod-shaped restriction member 24 and is inserted into a second guide hole 31 formed parallel to the first guide hole 28. The second guide hole 31 allows the rotation stopping member 30 to slide smoothly in the vertical direction. The bottom end 30b of the rotation stopping member 30 abuts on the cam surface 15 of the hinge 6. When the first and second housings 3 and 5 are closed such that an angle formed therebetween is less than the predetermined angle (about 120° in the present embodiment), the bottom end 30b is pushed upward by the cam surface 15 and the top end 30a positioned laterally outside the protrusion 29 contacts the protrusion 29 by the right side. In this way, the clockwise rotation of the liquid crystal display part 2 is prevented. Specifically, as shown in FIG. 5, when the protrusion 29 is sandwiched between the top end 30a and the rod-shaped restriction member 24, the liquid crystal display part 2 cannot be rotated.

At part of the rotation stopping member 30 close to the bottom end 30b, a second abutting plate 32 having a rectangular through hole 32a for passing the rod-shaped restriction member 24 is provided to face the first abutting plate 25 of the rod-shaped restriction member 24. A compression coil spring 33 as an elastic member is arranged around the rod-shaped restriction member 24 between the first and second abutting plates 25 and 32. The compression coil spring 33 abuts on the first abutting plate 25 at one end and to the second abutting plate 32 at the other end, thereby biasing the liquid crystal display part 2 to be oriented portrait or landscape.

Figure 8:
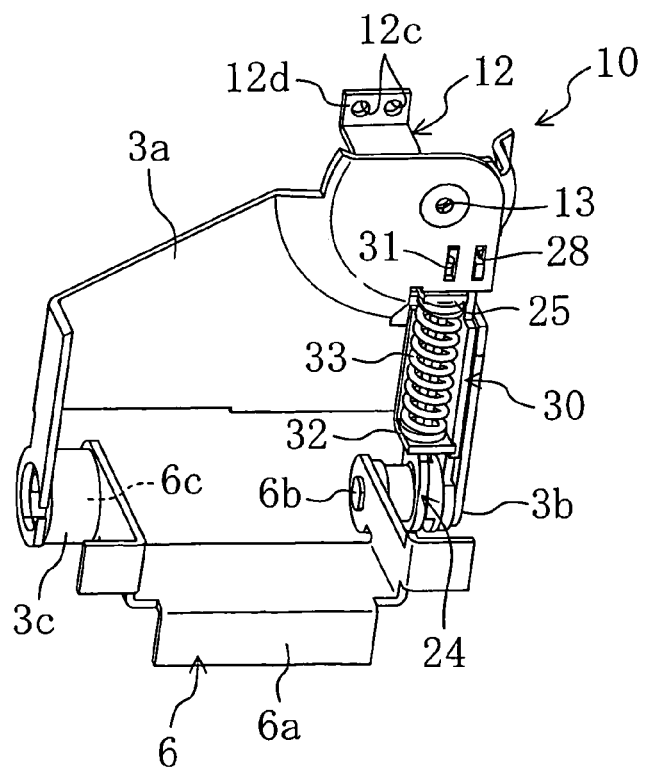
FIG. 8 is an oblique view illustrating the support mechanism, the hinge and the vicinity as viewed from the back when the folding cellular phone is opened and the liquid crystal display part is portrait-oriented.
Figure 15:
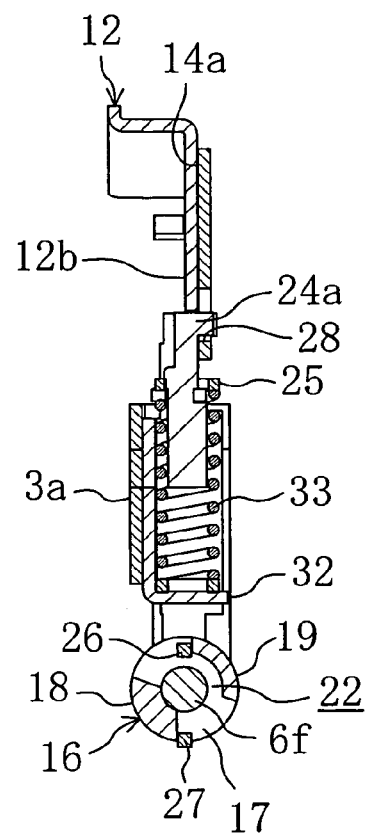
FIG. 15 is a view corresponding to FIG. 13 when the orientation of the liquid crystal display part is changing to portrait or landscape.
Figure 16:
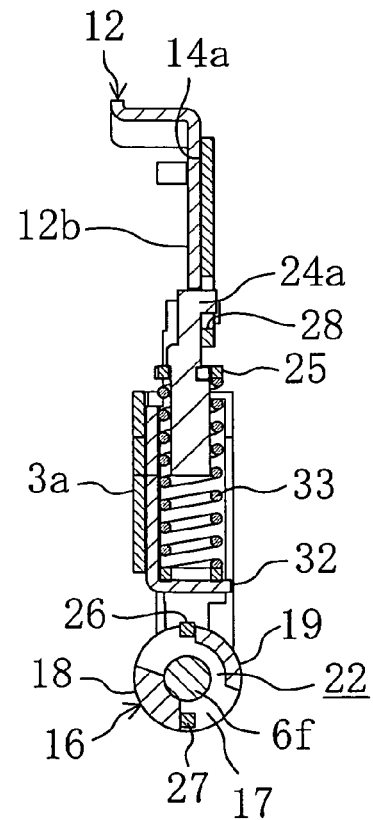
FIG. 16 is a view corresponding to FIG. 13 when the liquid crystal display part is landscape-oriented.

In the thus configured folding cellular phone 1, the rod-shaped restriction member 24 is operated together with the support mechanism 10 and the hinge 6. When the liquid crystal display part 2 is in the portrait orientation as shown in FIGS. 5, 8 and 13, the upper insertion part 26 is out of the restriction hole 17 and the lower insertion part 27 can move within the open/close permitting gap 22 of the restriction hole 17. Therefore, the first and second housings 3 and 5 are closed to form an angle less than 120°. When the liquid crystal display part 2 is not in the portrait orientation as shown in FIGS. 15 and 16, the upper and lower insertion parts 26 and 27 are positioned in the restriction hole 17. Therefore, the first and second housings 3 and 5 are moved freely unless the upper and lower insertion parts 26 and 27 contact the first and second fan-shaped walls 18 and 19 defining the restriction hole 17. For example, the first and second housings 3 and 5 may be closed to such a degree that the angle formed by the first and second housings 3 and 5 is in the range of about 120° to 160°. The range may be adjusted by the shape of the first and second fan-shaped walls 18 and 19. Thus, when the liquid crystal display part 2 is not in the portrait orientation, the first and second housings 3 and 5 cannot be closed to form an angle less than 120°.

As shown in FIG. 12, only when the angle formed by the first and second housings 3 and 5 is 120° or greater, the rotation stopping member 30 abuts on the rotation permitting part 15b of the cam surface 15 and slides toward the hinge 6. Therefore, the rotation stopping member 30 does not contact the protrusion 29 of the mounting bracket 12 even if the orientation of the liquid crystal display part 2 is changed between portrait and landscape. Further, when the liquid crystal display part 2 is rotated, the rod-shaped restriction member 24 is pushed by the cam surface 12a of the mounting bracket 12 toward the hinge 6 and the upper and lower insertion parts 26 and 27 move within the restriction hole 17 without contacting the first and second fan-shaped walls 18 and 19. Therefore, the rotation is permitted.

Next, an explanation of how the folding cellular phone 1 according to the present embodiment works will be provided.

When not used or in a stand-by state, the folding cellular phone 1 is closed.

When the cellular phone 1 is opened with the liquid crystal display part 2 in the portrait orientation as shown in FIG. 1, the liquid crystal display part 2 and the operation part 4 come into sight.

In the closed state, the bottom end 30b of the rotation stopping member 30 is pushed by the rotation stopping part 15a of the cam surface 15 toward the mounting bracket 12 and the compression coil spring 33 is pushed up by the second abutting plate 32 to be in the compressed state. Therefore, when the first and second housings 3 and 5 are opened to form an angle greater than 120°, the bottom end 30b of the rotation stopping member 30 abuts on the rotation permitting part 15b of the cam surface 15 and the first abutting plate 25 is pushed up by the elastic force of the compression coil spring 33. Then, the cam surface 12a is pushed up by the rod-shaped restriction member 24 to which the first abutting plate 25. As a result, the first housing 3 is pushed in the direction away from the second housing 5. In this manner, the opening movement is assisted.

As the liquid crystal display part 2 is in the portrait orientation, the abutting part 24a of the rod-shaped restriction member 24 lies on the right side of the projection 29 provided at the left end of the cam surface 12a. Thus, the counterclockwise rotation of the liquid crystal display part 2 is prevented.

As shown in FIG. 13, the upper insertion part 26 of the rod-shaped restriction member 24 is positioned outside the restriction hole 17 and the lower insertion part 27 is in the open/close permitting gap 22 of the restriction hole 17. Therefore, the insertion parts 26 and 27 do not contact the first and second fan-shaped walls 18 and 19 even if the first and second housings 3 and 5 are opened or closed. As the open/close movement of the first and second housings 3 and 5 is not hindered, the first and second housings 3 and 5 are freely closed and opened at about 160° where the lower insertion part 27 contacts the first fan-shaped wall 18.

Then, the first and second housings 3 and 5 are kept opened at 120° or more. With the liquid crystal display part 2 kept in the portrait orientation, the user handles the operation keys of the operation part 4 to talk on the phone or send/receive e-mails. In this state, the upper insertion part 26 is positioned immediately above the restriction hole 17 and the lower insertion part 27 is in the restriction hole 17. Therefore, the rod-shaped restriction member 24 is permitted to slide in the vertical direction.

When the landscape orientation is preferred, for example, to watch a landscape image of the digital terrestrial television broadcasting or prepare or read e-mails in English, the user rotates the portrait liquid crystal display part 2 to change the display orientation to landscape.

Figure 9:
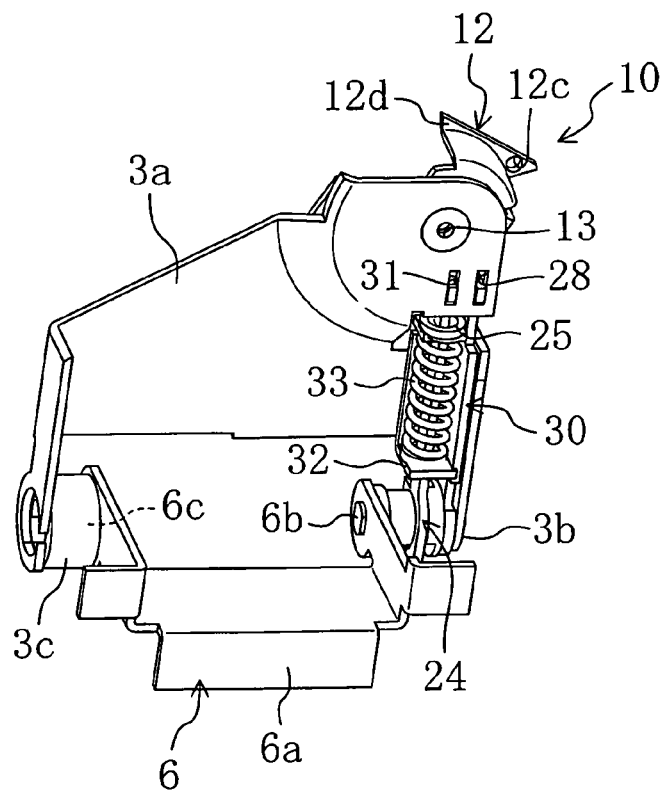
FIG. 9 is a view corresponding to FIG. 8 when the orientation of the liquid crystal display part is changing.
Figure 10:
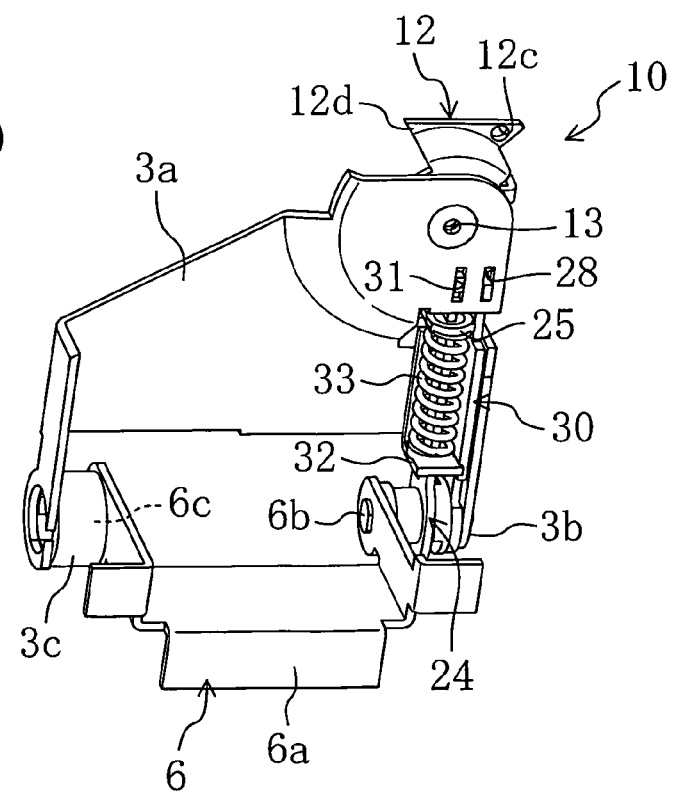
FIG. 10 is a view corresponding to FIG. 8 when the liquid crystal display part is landscape-oriented.
Figure 11:
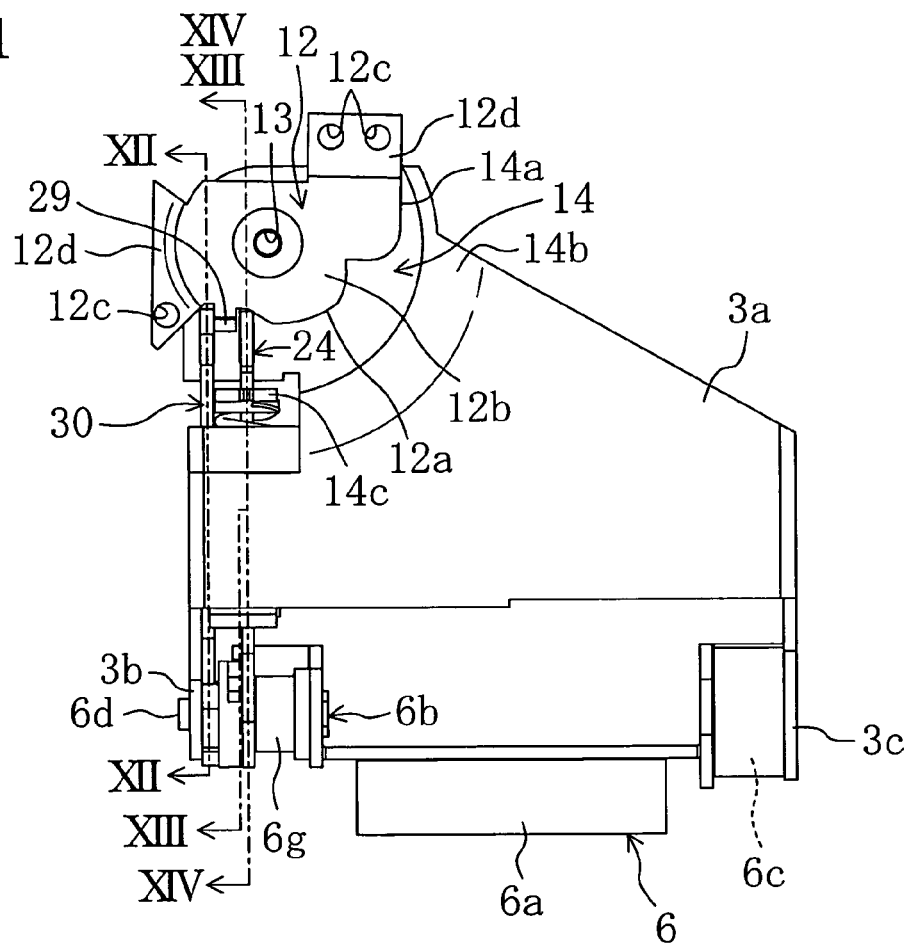
FIG. 11 is a front view illustrating the support mechanism, the hinge and the vicinity when the liquid crystal display part is portrait-oriented.

First, the user rotates the liquid crystal display part 2 clockwise as viewed from the front against the biasing force of the compression coil spring 33 such that the bottom corner 2b comes to the position as shown in FIG. 2. At this time, the rod-shaped restriction member 24 is pushed by the cam surface 12a toward the hinge 6 as shown in FIGS. 5, 6 and 9. As the insertion parts 26 and 27 of the rod-shaped restriction member 24 are positioned immediately above the restriction hole 17, the insertion parts 26 and 27 do not abut on the first and second fan-shaped walls 18 and 19. Thus, the rod-shaped restriction member 24 moves in the vertical direction in response to the rotation of the liquid crystal display part 2.

When the rod-shaped restriction member 24 passes the convex center part of the cam surface 12a, the compression coil spring 33 in the compressed state applies biasing force to the liquid crystal display part 2 to assist the liquid crystal display part 2 to be landscape-oriented. Also in this state, the insertion part 26 is in the restriction hole 17. At this time, the vertical travel of the rod-shaped restriction member 24 is adjusted such that the insertion hole 26 does not contact the small diameter part 6f.

In the landscape orientation as shown in FIGS. 3, 7, 10 and 16, the horizontal center of the liquid crystal display part 2 is positioned substantially at the horizontal center of the first housing 3. A landscape image is displayed full on the screen of the landscape liquid crystal display 2a, and then the user does input with the operation keys of the operation part 4 to take part in a quiz show, do shopping or complete payment to a bank account through the display.

After use, the liquid crystal display part 2 is rotated counterclockwise as viewed from the front against the biasing force of the compression coil spring 33. When the rod-shaped restriction member 24 passes the convex center part of the cam surface 12a, the compression coil spring 33 applies biasing force to the liquid crystal display part 2 to return to the portrait orientation.

If the user tries to close the first and second housings 3 and 5 to form an angle less than 120° when the liquid crystal display part 2 is on the way to changing the orientation or in the landscape orientation, the insertion parts 26 and 27 abut on the first and second fan-shaped walls 18 and 19 to hinder the closing movement. Therefore, the liquid crystal display part 2 will not contact the second housing 5.

Then, the cellular phone 1 is closed to be in a stand-by state.

In the folding cellular phone 1 according to the present embodiment, the rod-shaped restriction member 24 restricts the movement of the first and second housings 3 and 5 so as not to reduce the angle formed between the first and second housings 3 and 5 less than 120° when the liquid crystal display part 2 is not in the portrait orientation, thereby preventing the liquid crystal display part 2 from contacting the second housing 5. Thus, the liquid crystal display part 2 is formed larger without increasing the size of the cellular phone and shifting the rotation axis 13 of the liquid crystal display part 2 away from the second housing 5. Therefore, the liquid crystal display part 2 and the second housing 5 are prevented from damage caused by changing the orientation of the liquid crystal display part 2.

According to the present embodiment, the liquid crystal display part 2 is allowed to change the orientation between portrait and landscape only when the angle formed by the first and second housings 3 and 5 is greater than 120°. Therefore, the liquid crystal display part 2 and the second housing 5 are prevented from damage caused by changing the orientation of the liquid crystal display part 2 without reducing the size of the liquid crystal display part 2, increasing the size of the cellular phone and shifting the rotation axis 13 of the liquid crystal display part 2 away from the second housing 5.

According to the present embodiment, the rod-shaped restriction member 24 is operated together with the support mechanism 10 and the hinge 6 so that the first and second housings 3 and 5 cannot be closed to form an angle less than the predetermined angle when the liquid crystal display part 2 is not in the portrait orientation. This structure makes it possible to easily change the angle for controlling the open/close movement. Thus, the rod-shaped restriction member 24 prevents the liquid crystal display part 2 from contacting the second housing 5 with high reliability.

According to the present embodiment, when the liquid crystal display part 2 is changed from portrait to landscape orientation, one end of the rod-shaped restriction member 24 provided in the first housing 3 is pushed by the cam surface 12a toward the second housing 5 and the insertion parts 26 and 27 provided at the other end of the rod-shaped restriction member 24 are inserted in the restriction hole 17. The insertion parts 26 and 27 contact the first and second fan-shaped walls 18 and 19 to hinder the rotation of the left open/close shaft 6b at the hinge 6, thereby restricting the open/close movement of the first and second housings 3 and 5. Therefore, when the liquid crystal display part 2 is not in the portrait orientation, the first and second housings 3 and 5 cannot be closed to form an angle less than 120°. As a result, even if the rotation axis 13 of the liquid crystal display part 2 is not shifted away from the second housing 5, the liquid crystal display part 2 and the second housing 5 are prevented from damage caused by changing the orientation of the liquid crystal display part 2.

According to the present embodiment, when the first and second housings 3 and 5 are closed to form an angle less than 120°, an end of the rod-shaped rotation stopping member 30 is pushed by the cam surface 15 so that the other end is positioned laterally outside the protrusion 29 to hinder the rotation of the liquid crystal display part 2. Therefore, even if the rotation axis 13 of the liquid crystal display part 2 is not shifted away from the second housing 5, the liquid crystal display part 2 and the second housing 5 are prevented from damage caused by changing the orientation of the liquid crystal display part 2.

According to the present embodiment, the compression coil spring 33 assists the liquid crystal display part 2 to change to portrait or landscape orientation. Therefore, the user can change the orientation of the liquid crystal display part 2 to portrait or landscape with a single movement by a single hand. Thus, the folding cellular phone 1 is provided with greater ease of operation.

According to the present embodiment, upon changing the orientation of the liquid crystal display part 2 from portrait to landscape, when one end of the rod-shaped restriction member 24 passes the convex center part of the cam surface 12a, the compression coil spring 33 in the compressed state exerts elastic force on the first abutting plate 25 to push the cam surface 12a up to assist the orientation change of the liquid crystal display part 2. The orientation change from landscape to portrait is also assisted by the elastic force of the compression coil spring 33. When the closed cellular phone 1 is opened, the compression coil spring 33 is pushed up by the second abutting plate 32 of the rotation stopping member 30 to push the first abutting plate 25 of the rod-shaped restriction member 24 up, thereby biasing the first housing 3 toward the direction away from the second housing 5 via the rod-shaped restriction member 24. In this way, the opening movement is assisted. Thus, the folding cellular phone 1 is given with greater ease of operation.

According to the present embodiment, the support mechanism 10 makes it possible to change the orientation of the liquid crystal display part 2 while the contact between the liquid crystal display part 2 and the second housing 5 is prevented and the horizontal center of the liquid crystal display part 2 is positioned substantially at the horizontal center of the first housing 3. Therefore, the display screen is enlarged as much as possible and the liquid crystal display part 2 is positioned substantially at the horizontal center of the cellular phone 1 whether the orientation is portrait or landscape. Thus, the folding cellular phone 1 is provided with good looks, a visible liquid crystal display and ease of operation.

According to the present embodiment, the liquid crystal display part 2 has a linear side which comes to the bottom in the portrait orientation. When the liquid crystal display part 2 is not in the portrait orientation, the movement of the first and second housings 3 and 5 are restricted so as not to form an angle less than 120°. Therefore, even if the rotation axis 13 of the liquid crystal display part 2 is not shifted away from the second housing 5, the display screen is enlarged nearly to the bottom end of the portrait liquid crystal display part 2. Thus, the folding cellular phone 1 is provided with a larger display and greater ease of operation without increasing the size of the cellular phone itself.

In the above-described embodiment, the upper and lower insertion parts 26 and 27 are provided. The effect of the present invention is exerted even if the lower insertion part 27 is omitted. However, if the two upper and lower insertion parts 26 and 27 are used, strength against the open/close movement improves.

OTHER EMBODIMENTS

The folding cellular phone of the present invention may also have the following structures.

Figure 19:
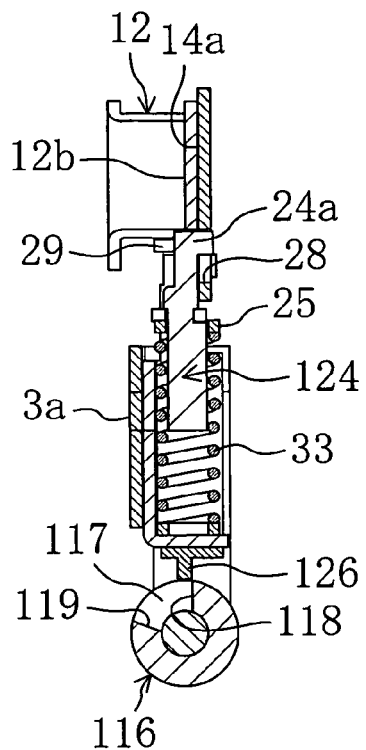
FIG. 19 is a view corresponding to FIG. 13 illustrating a different embodiment of the folding cellular phone.
Figure 20:
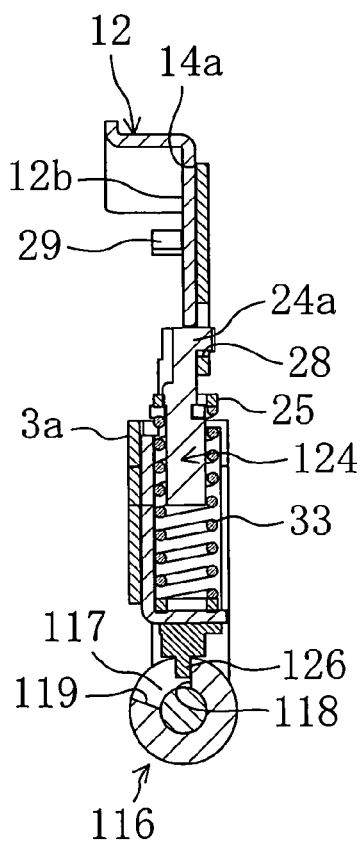
FIG. 20 is a view corresponding to FIG. 15 illustrating the different embodiment of the folding cellular phone.
Figure 21:
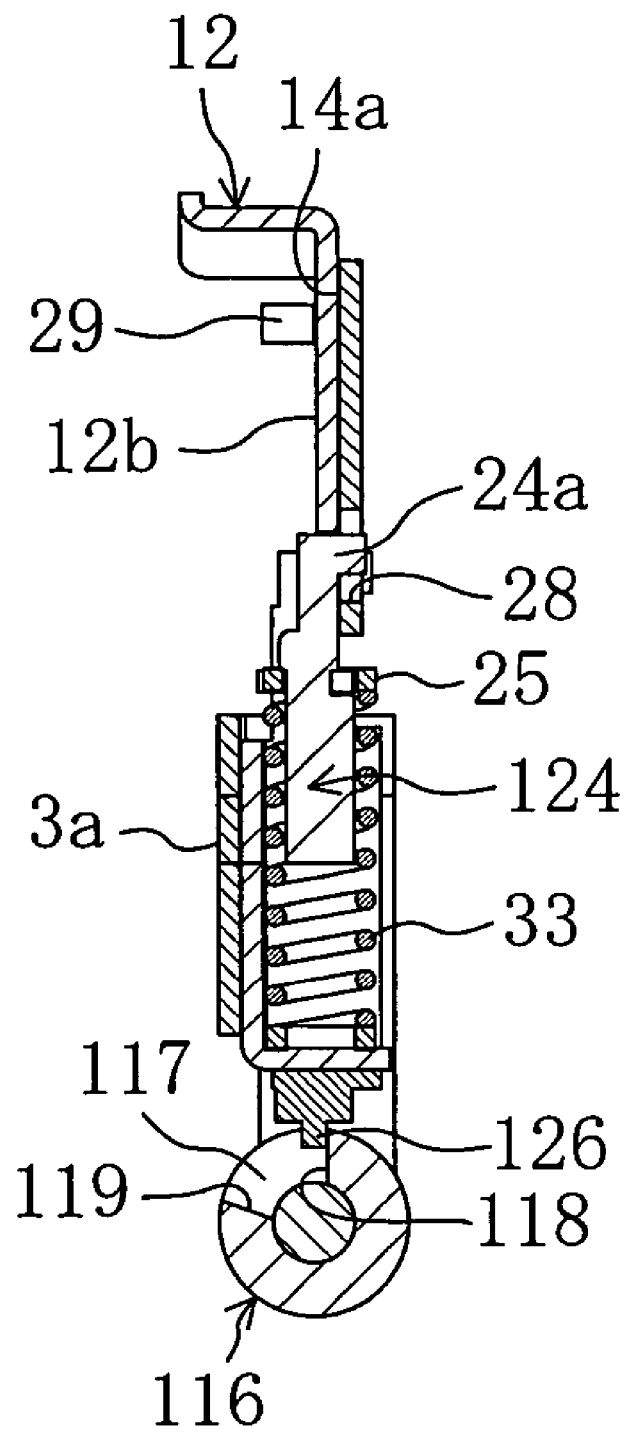
FIG. 21 is a view corresponding to FIG. 16 illustrating the different embodiment of the folding cellular phone.

For example, the bottom portion of the rod-shaped restriction member 24 may be shaped as shown in FIGS. 19 to 21. Specifically, a rod-shaped restriction member 124 according to another embodiment has an insertion part 126 protruding downward from the bottom end thereof. A cam member 116 has a restriction hole 117 shaped to provide a fan-shaped opening only at the top. This embodiment offers the same effect as the above-described embodiment.

Specifically, as shown in FIG. 19, when the liquid crystal display part 2 is in the portrait orientation, the insertion part 126 is positioned above the restriction hole 117 and therefore the movement of the first and second housings 3 and 5 is not restricted. In the changing state shown in FIG. 20 or in the landscape orientation shown in FIG. 21, the insertion part 126 enters the restriction hole 117 so that the rotation of the left open/close shaft 6b is restricted by wall surfaces 118 and 119 defining the restriction hole 117.

When the liquid crystal display part 2 is in the portrait orientation, the insertion part 126 does not contact the wall surfaces 118 and 119. Therefore, the first and second housings 3 and 5 may be closed to form an angle less than 120°.

When the liquid crystal display part 2 is not in the portrait orientation, the insertion part 126 contacts the wall surfaces 118 and 119. Therefore, the first and second housings 3 and 5 cannot be closed to form an angle less than 120°.

Thus, even if the rotation axis 13 of the liquid crystal display part 2 is not shifted away from the second housing 5, the liquid crystal display part 2 and the second housing 5 are prevented from damage caused by changing the orientation of the liquid crystal display part 2 and the display screen is enlarged without increasing the size of the cellular phone itself.

According to the above-described embodiment, the support mechanism 10 makes it possible to change the orientation of the liquid crystal display part 2 from portrait to landscape by rotating the liquid crystal display part 2 clockwise when viewed from the front. However, the orientation change may be carried out by rotating the liquid crystal display part 2 counterclockwise. In this case, the recess 14 is formed in the right portion of the first housing 3, and so the supporting mechanism 10 and the rod-shaped restriction part 24 are.

According to the above-described embodiment, the horizontal center of the portrait- or landscape-oriented liquid crystal display device 2 is positioned substantially at the horizontal center of the first housing 3. However, the horizontal center of the liquid crystal display part 2 may be shifted to the right or left.

The rotation stopping member 30 according to the above-described embodiment is not an essential component. Even if it is omitted, the effect of the present invention is exerted only by the rod-shaped restriction member 24. However, the presence of the rotation stopping member 30 improves the strength against the open/close movement.

The angle at which the opening/closing of the phone is restricted is set to 120°. However, the angle is not limited thereto and the maximum opening angle is not also limited to 160°.

In the above-described embodiment, the liquid crystal display part 2 is provided with the liquid crystal display 2a. However, the liquid crystal display 2a may be replaced with an organic electroluminescence display.

The above-described embodiment is given as an essentially preferable example and does not limit the present invention, the object of the present invention and the scope of application of the present invention.

What is claimed is:

1. A folding cellular phone comprising:
a first housing provided with a liquid crystal display part on the surface thereof;
a second housing including an operation part formed on the surface thereof; and
a hinge for connecting the first housing and the second housing in a pivotable manner to open/close the folding cellular phone between an open position and a closed position and a predetermined angle between the open position and the closed position, wherein
the liquid crystal display part is supported on the first housing such that the orientation of the liquid crystal display part is changeable between a portrait position and a landscape position and
the movement of the first and second housings is restricted by an open/close restriction means to prevent movement between the predetermined angle and the closed position if the liquid crystal display part is not in the portrait position.

2. A folding cellular phone according to claim 1, wherein the orientation of the liquid crystal display part is changeable between portrait and landscape only when the angle formed between the first and second housings is greater than the predetermined angle.

3. A folding cellular phone according to claim 2, wherein the liquid crystal display part is supported on the first housing by a support mechanism such that the orientation of the liquid crystal display part is changeable between portrait and landscape and
the open/close restriction means is operated together with the support mechanism and the hinge such that the movement of the first and second housings is restricted so as not to form an angle less than the predetermined angle therebetween when the liquid crystal display part is not in the portrait orientation.

4. A folding cellular phone according to claim 1, wherein the first housing is provided with a recess which is formed at a portion shifted to the right or left from the horizontal center of the first housing for installing therein the support mechanism and has an opening in part of the sidewall thereof close to the hinge,
the support mechanism is attached to the rear surface of the liquid cryptal display part and includes a mounting bracket to be installed in the recess of the first housing and a rotation axis provided in the recess to support the liquid crystal display part on the first housing via the mounting bracket such that the orientation of the liquid crystal display part is changeable between portrait and landscape, the mounting bracket having a cam surface which is a side surface of a convex portion thereof bulging toward the hinge,
the hinge includes an open/close shaft for connecting the first and second housings in a pivotable manner to open/close the folding cellular phone and a restriction hole formed in a predetermined position of the circumference surface of the open/close shaft and
the open/close restriction means is a rod-shaped restriction member which is inserted in the opening in the recess and abuts on the cam surface of the mounting bracket at one end such that when the orientation of the liquid crystal display part is changed from portrait to landscape, the open/close restriction means is pushed by the cam surface toward the hinge and an insertion part formed at the other end is inserted in the restriction hole of the hinge, thereby restricting the open/close movement of the first and second housings.

5. A folding cellular phone according to claim 4, wherein part of the outer circumference surface of the hinge which is positioned laterally outside the restriction hole serves as a cam surface,
the mounting bracket attached to the liquid crystal display part includes a protrusion which is formed slightly laterally inside the cam surface of the hinge and protrudes toward the hinge for restricting the rotation of the liquid crystal display part and
a rod-shaped rotation stopping member for restricting the rotation of the liquid crystal display part is provided laterally outside the rod-shaped restriction member and inserted in the opening in the recess such that, when the angle formed between the first and second housings is less than the predetermined angle, one end of the rod-shaped restriction member abutting on the cam surface of the hinge is pushed by the cam surface of the hinge toward the mounting bracket and the other end positioned laterally outside the protrusion of the mounting bracket abuts on the protrusion of the mounting bracket to restrict the rotation of the liquid crystal display part.

6. A folding cellular phone according to claim 5, wherein an elastic member for biasing the liquid crystal display part to be in the portrait or landscape orientation is provided.

7. A folding cellular phone according to claim 6, wherein the elastic member is a compression coil spring which abuts on a first abutting plate attached to the rod-shaped restriction member at one end and on a second abutting plate attached to the rotation stopping member at the other end.

8. A folding cellular phone according to claim 1, wherein the horizontal center of the portrait- or landscape-oriented liquid crystal display part is positioned substantially at the horizontal center of the first housing.

9. A folding cellular phone according to claim 1, wherein the liquid crystal display part has a liner side which comes to the bottom when the liquid crystal display part is in the portrait orientation.

* * * * *